US009552004B1

(12) United States Patent
Dixit et al.

(10) Patent No.: US 9,552,004 B1
(45) Date of Patent: Jan. 24, 2017

(54) LINEAR VOLTAGE REGULATOR

(71) Applicant: FREESCALE SEMICONDUCTOR, INC., Austin, TX (US)

(72) Inventors: Ravi Dixit, Noida (IN); Parul K. Sharma, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 53 days.

(21) Appl. No.: 14/809,273

(22) Filed: Jul. 26, 2015

(51) Int. Cl.

| | |
|---|---|
| ***G05F 1/00*** | (2006.01) |
| ***G05F 1/565*** | (2006.01) |
| ***H02H 7/00*** | (2006.01) |
| ***H02H 9/00*** | (2006.01) |
| ***G05F 1/56*** | (2006.01) |

(52) U.S. Cl.
CPC .......................................... *G05F 1/56* (2013.01)

(58) Field of Classification Search
CPC ............ G05F 1/56; G05F 1/565; G05F 1/575; G05F 3/242
USPC ... 323/273–275, 282, 284, 285, 289; 361/18
See application file for complete search history.

(56) References Cited

U.S. PATENT DOCUMENTS

| | | | | |
|---|---|---|---|---|
| 5,101,174 A * | 3/1992 | Hynecek | H03F 3/70 | 257/239 |
| 6,246,221 B1 | 6/2001 | Xi | | |
| 6,831,486 B1 * | 12/2004 | Hynecek | H04N 5/37452 | 327/514 |
| 6,977,490 B1 * | 12/2005 | Zhang | G05F 1/575 | 323/280 |
| 7,085,943 B2 | 8/2006 | Chun et al. | | |
| 7,714,551 B2 | 5/2010 | Fan et al. | | |
| 8,760,131 B2 | 6/2014 | Van Ettinger et al. | | |
| 2005/0189930 A1 * | 9/2005 | Wu | G05F 1/575 | 323/280 |
| 2006/0192538 A1 * | 8/2006 | Wang | G05F 1/575 | 323/282 |
| 2011/0267017 A1 * | 11/2011 | Zhang | G05F 1/575 | 323/280 |
| 2012/0262135 A1 * | 10/2012 | Childs | G05F 1/575 | 323/269 |
| 2013/0241505 A1 * | 9/2013 | Chang | G05F 1/575 | 323/282 |
| 2014/0191739 A1 * | 7/2014 | Kim | G05F 1/575 | 323/280 |

* cited by examiner

*Primary Examiner* — Adolf Berhane
*Assistant Examiner* — Gary Nash
(74) *Attorney, Agent, or Firm* — Charles E. Bergere

(57) ABSTRACT

A voltage regulator includes an error amplifier, a voltage buffer, a transistor, a frequency compensation circuit, a capacitor, and a resistive network. The error amplifier receives a reference signal and a feedback signal, and generates an intermediate control signal. The voltage buffer receives the intermediate control signal and generates a control signal. The transistor has a gate that receives the control signal, a first terminal that receives a supply voltage signal, and a second terminal that generates a regulated output signal. The frequency compensation circuit is connected to the second terminal of the transistor. The capacitor is connected to the error amplifier and the frequency compensation circuit. The resistive network receives the regulated output signal and generates the feedback signal.

14 Claims, 2 Drawing Sheets

-PRIOR ART-

LINEAR VOLTAGE REGULATOR

BACKGROUND

The present invention generally relates to integrated circuits, and more particularly, to a voltage regulator.

Integrated circuits (ICs) such as systems-on-chips (SoCs) and application specific integrated circuits (ASICs) integrate various analog and digital components on a single chip. These components require stable supply voltage signals for performing operations. Thus, ICs include voltage regulators for regulating supply voltage signals. A voltage regulator rejects noise injected into a supply voltage signal (measured as Power Supply Rejection Ratio (PSRR)) from a voltage source and provides a regulated output signal to IC components. For example, a linear regulator with a high PSRR (>20 dB) is needed for low jitter Gigabit signals.

Referring now to FIG. 1, a schematic block diagram of a conventional voltage regulator 100 is shown. The voltage regulator 100 includes an error amplifier 102, a transistor 104, a compensation capacitor 106, and a resistive network 108. The voltage regulator 100 is connected to a load capacitor 110 and a load impedance 112.

The error amplifier 102 has a first input terminal for receiving a reference signal ($V_{REF}$) and a second input terminal for receiving a feedback signal ($V_{FB}$). The reference signal is a bandgap reference voltage signal. The error amplifier 102 amplifies a difference between the voltage levels of the two input signals and generates a control signal $V_{CONT}$.

The transistor 104 has a source terminal for receiving a supply voltage signal ($V_{DD}$), a gate terminal that receives the control signal $V_{CONT}$, and a drain terminal for generating an output signal ($V_{OUT}$).

The compensation capacitor 106 has a first terminal connected to the gate terminal of the transistor 104, and a second terminal connected to the drain terminal of the transistor 104. The compensation capacitor 106 increases stability of the voltage regulator 100 by splitting poles of the voltage regulator 100. Thus, the stability of the voltage regulator 100 is increased by a technique known as "pole-splitting" (also known as "Miller compensation").

The resistive network 108 is a voltage divider and includes first and second resistors 114 and 116 connected in series between the drain terminal of the transistor 104 and ground. The resistive network 108 also has a voltage tap for outputting the feedback signal $V_{FB}$.

The load capacitor 110 has a first terminal connected to the drain terminal of the transistor 104 for receiving the output signal and a second terminal connected to ground. The load capacitor 110 increases the stability of the voltage regulator 100. The load capacitor 110 and the load impedance 112 form the load of the voltage regulator 100.

Ripples (noise) in the supply voltage signal cause the voltage level of the output signal to deviate from a desired voltage level, which results in the deviation of the voltage level of the feedback signal from a desired voltage level, i.e, the voltage level of the reference signal. When the voltage level of the feedback signal is less than the voltage level of the reference signal, the error amplifier 102 amplifies the difference between the voltage levels of the feedback signal and the reference signal and generates the control signal, and the current through the transistor 104 increases, which restores the voltage level of the output signal to the desired voltage level. When the voltage level of the feedback signal is greater than the voltage level of the reference signal, the error amplifier 102 amplifies this difference and generates the control signal where the current through the transistor 104 decreases, which restores the voltage level of the output signal to the desired voltage level. Thus, the voltage regulator 100 provides a regulated output signal.

The voltage regulator 100 works efficiently for ripples frequencies less than about 100 megahertz (MHz), but fails to maintain a PSRR about 20 decibels (dB), for ripple frequencies between 100 MHz and 1000 MHz because the bandwidth of the error amplifier 102 is impacted negatively by a pole formed at 100 MHz due to capacitances at the output of the error amplifier 102. The capacitances at the output of the error amplifier 102 include a capacitance of the gate of the transistor 104 and a Miller effect capacitance of the compensation capacitor 106. The PSRR of the voltage regulator 100 is a measure of effectiveness of the voltage regulator 100 in rejecting noise in the supply voltage signal. However, the PSRR of the voltage regulator 100 improves at ripple frequencies greater than 1000 MHz because the load capacitor 110 provides a low impedance to ground. Thus, the voltage regulator 100 fails to maintain the absolute value of the PSRR above the desired level for ripples frequencies between 100 and 1000 MHz. Further, the size of the transistor 104 is large for driving heavy loads, which increases the area of a device that includes the voltage regulator 100.

Techniques to overcome the aforementioned problems involve complex circuits that tend to increase the overall circuit area and power consumption.

Therefore, it would be advantageous to have a voltage regulator that provides a regulated output signal at all frequencies without unnecessarily increasing circuit are and power consumption.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
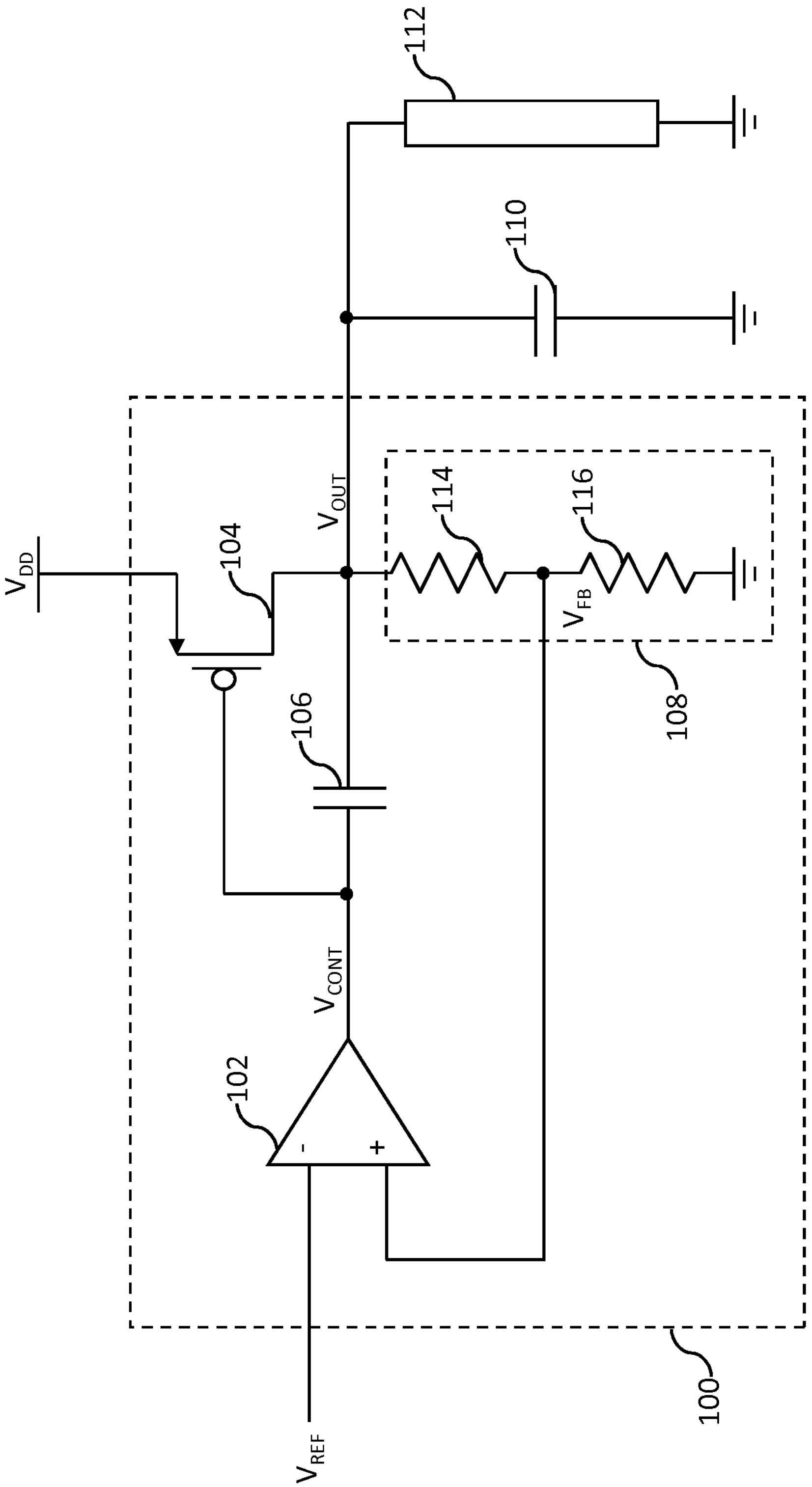
FIG. 1 is a schematic block diagram of a conventional voltage regulator.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a voltage regulator is provided. The voltage regulator includes an error amplifier, a voltage buffer, a transistor, a frequency compensation circuit, a capacitor, and a resistive network. The error amplifier receives a reference signal and a feedback signal and generates an intermediate control signal. The voltage buffer receives the intermediate control signal and generates a control signal. The transistor has a gate terminal for receiving the control signal, a first terminal for receiving a supply voltage signal, and a second terminal for generating a regulated output signal. The frequency compensation circuit is connected to the second terminal of the transistor. The capacitor has a first terminal connected to the error amplifier and a second terminal connected to the frequency compensation circuit. The resistive network receives the regulated output signal and outputs the feedback signal.

In another embodiment of the present invention, a voltage regulator is provided. The voltage regulator includes an error amplifier, a voltage buffer, a transistor, a frequency compensation circuit, a capacitor, and a resistive network. The error amplifier receives a reference signal and a feedback signal and generates an intermediate control signal. The voltage buffer receives the intermediate control signal and generates a control signal. The transistor has a gate terminal for receiving the control signal, a first terminal for receiving a supply voltage signal, and a second terminal for generating a regulated output signal. The voltage buffer isolates the error amplifier from the transistor, thereby improving a bandwidth of the error amplifier. The frequency compensation circuit is connected to the second terminal of the transistor. The capacitor has a first terminal connected to the error amplifier and the frequency compensation circuit. The frequency compensation circuit improves the bandwidth of the error amplifier by reducing a Miller effect capacitance of the capacitor, thereby reducing an effect of noise in the supply voltage signal on the regulated output signal. The resistive network receives the regulated output signal and outputs the feedback signal.

Various embodiments of the present invention provide a linear voltage regulator. The voltage regulator includes an error amplifier, a voltage buffer, a transistor, a frequency compensation circuit, a capacitor, and a resistive network. The error amplifier receives a reference signal and a feedback signal. The error amplifier amplifies a differential between voltage levels of the feedback signal and the reference signal and generates an intermediate control signal. The voltage buffer receives the intermediate control signal and generates a control signal. The transistor has a gate terminal for receiving the control signal, a first terminal for receiving a supply voltage signal, and a second terminal for generating a regulated output signal. The frequency compensation circuit is connected to the second terminal of the transistor. The capacitor has a first terminal connected to the error amplifier and a second terminal connected to the frequency compensation circuit. The resistive network receives the regulated output signal and outputs the feedback signal.

The capacitor increases stability of the voltage regulator. The voltage buffer isolates the error amplifier from the gate terminal of the transistor, thereby improving a bandwidth of the error amplifier. The frequency compensation circuit decreases a gain multiplication factor by which a capacitance of the capacitor is multiplied due to Miller effect. The gain multiplication factor is frequency dependent. This improves the bandwidth of the error amplifier.

Figure 2:
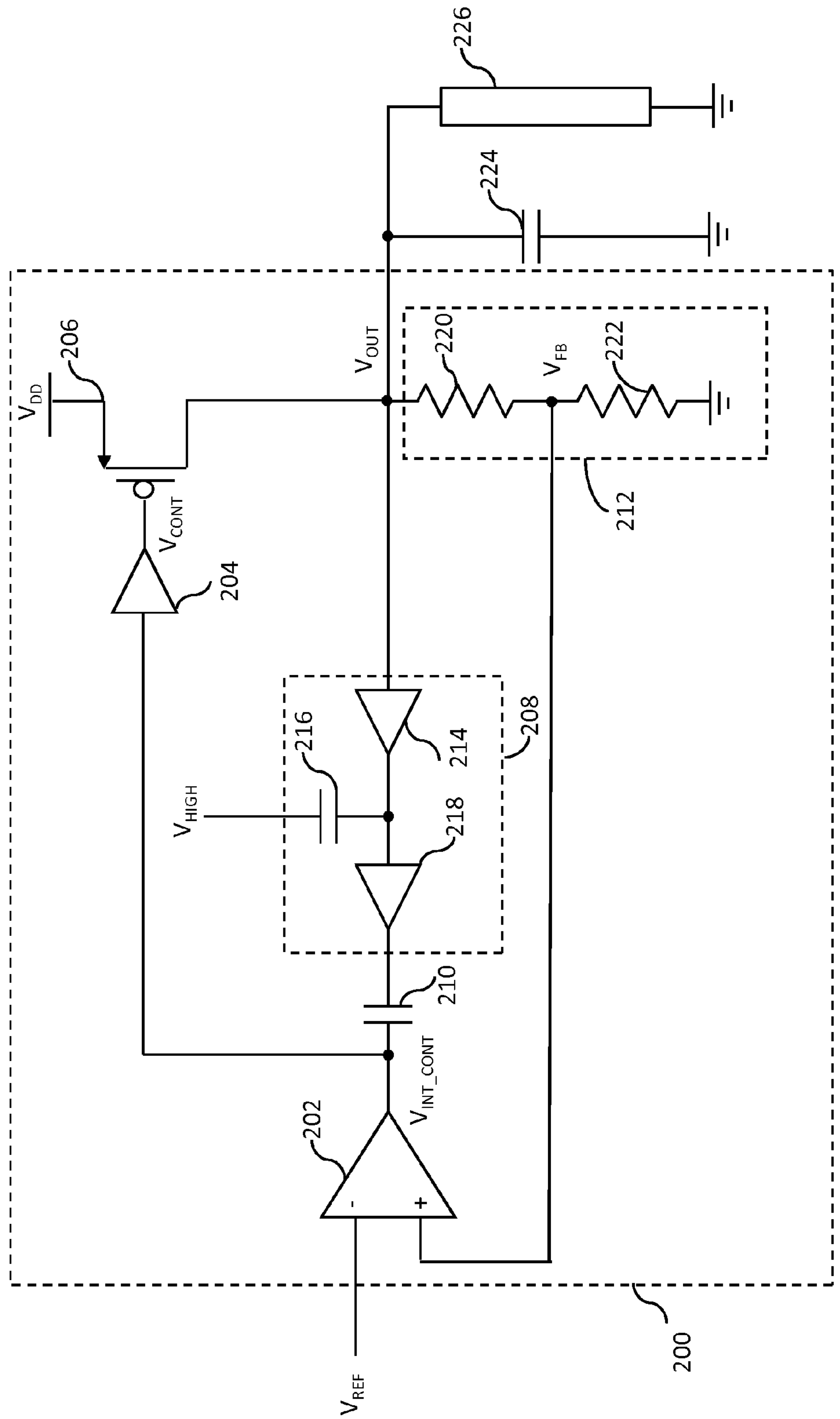
FIG. 2 is a schematic block diagram of a voltage regulator in accordance with an embodiment of the present invention.

Referring now to FIG. 2, a schematic block diagram of a voltage regulator 200 in accordance with an embodiment of the present invention is shown. The voltage regulator 200 includes an error amplifier 202, a first voltage buffer 204, a transistor 206, a frequency compensation circuit 208, a first capacitor 210, and a resistive network 212. The frequency compensation circuit 208 includes a second voltage buffer 214, a second capacitor 216, and a third voltage buffer 218. In an example, the resistive network 212 includes first and second resistors 220 and 222.

The error amplifier 202 has a first input terminal for receiving a reference signal ($V_{REF}$) and a second input terminal for receiving a feedback signal ($V_{FB}$). In an example, the reference signal is a bandgap reference voltage signal. The error amplifier 202 amplifies a differential between voltage levels of the feedback signal and the reference signal and generates an intermediate control signal ($V_{INT\_CONT}$) at an output terminal thereof.

The first voltage buffer 204 is connected to the output terminal of the error amplifier 202 for receiving the intermediate control signal. The first voltage buffer 204 generates a control signal ($V_{CONT}$).

In one embodiment, the transistor 206 is a p-channel metal-oxide semiconductor (PMOS) transistor. The transistor 206 has a gate terminal connected to the first voltage buffer 204 for receiving the control signal and a source terminal for receiving a supply voltage signal ($V_{DD}$). The transistor 206 has a drain terminal for generating an output signal ($V_{OUT}$).

The second voltage buffer 214 is connected to the drain terminal of the transistor 206 for receiving the output signal. The second capacitor 216 has a first terminal connected to the second voltage buffer 214 and a second terminal for receiving a logic high signal ($V_{HIGH}$). The third voltage buffer 218 is connected to the first terminal of the second capacitor 216.

The first capacitor 210 has a first terminal connected to the output terminal of the error amplifier 202 and a second terminal connected to the third voltage buffer 218, i.e., the first capacitor 210 is connected between the error amplifier 202 and the frequency compensation circuit 208. The first capacitor 210 increases stability of the voltage regulator 200 by splitting poles of the voltage regulator 200. Thus, the stability of the voltage regulator 200 is increased by a technique known as "pole-spitting" (also known as "Miller compensation").

In one embodiment, the resistive network 212 comprises a voltage divider where the first and second resistors 220 and 222 are connected in series between the drain terminal of the transistor 206 and ground. The resistive network 212 has a voltage tap for outputting the feedback signal. It will be understood by those of skill in the art that the resistive network 212 can include any number of resistors.

In one embodiment, the voltage regulator 200 is connected to a load capacitor 224 and a load impedance 226 for providing a regulated output signal. The load capacitor 224 further increases the stability of the voltage regulator 200.

When the voltage level of the feedback signal is less than the voltage level of the reference signal, the error amplifier 202 amplifies the differential between the voltage levels of the feedback signal and the reference signal and generates the intermediate control signal such that the current through the transistor 206 increases, thereby restoring the voltage level of the output signal to a desired voltage level. When the voltage level of the feedback signal is greater than the voltage level of the reference signal, the error amplifier 202 amplifies the differential between the voltage levels of the feedback signal and the reference signal and generates the intermediate control signal such that the current through the transistor 206 decreases, thereby restoring the voltage level of the output signal to the desired voltage level. Thus, the voltage regulator 200 regulates the voltage level of the output signal, thereby providing a regulated output signal.

As the first voltage buffer 204 is connected between the output terminal of the error amplifier 202 and the gate terminal of the transistor 206, the first voltage buffer 204 isolates the error amplifier 202 from the gate terminal of the transistor 206. Further, the first voltage buffer 204 has a low input impedance. This prevents a bandwidth of the error amplifier 202 from being degraded and hence, the bandwidth of the error amplifier 202 is improved.

In an example, a first pole ($P_1$) of the voltage regulator 200 formed due to the first capacitor 210 is given by expression (1) as follows:

$$P_1=1/(R_{EFF}*C_1*\beta(\omega)*A(\omega)) \qquad (1)$$

where, $R_{EFF}$ represents an effective resistance of the output of the error amplifier 202, $C_1$ represents a capacitance of the first capacitor 210, $\beta(\omega)$ represents a gain of the frequency compensation circuit 208, and $A(\omega)$ represents combined gain of a unit comprising the first voltage buffer 204, the transistor 206, the resistive network 212, the load capacitor 224, and the load impedance 226.

A second pole ($P_2$) of the voltage regulator 200 formed due to the load capacitor 224 is given by expression (2) as follows:

$$P_2=1/(C_L*Z_L) \qquad (2)$$

where, $C_L$ represents a capacitance of the load capacitor 224, and $Z_L$ represents an impedance of the load impedance 226.

$\beta(\omega)$ is approximately equal to 1 for frequencies less than a first frequency and decreases as the frequency becomes greater than first frequency. It will be understood by those of skill in the art that the first frequency depends on the capacitance of the first capacitor 210, i.e., $C_1$ and lies between the frequencies of poles $P_1$ and $P_2$.

For ripple frequencies less than the first frequency, an impedance of the second capacitor 216 is high. In one embodiment, the first frequency is 100 megahertz (MHz). Thus, the gain of the frequency compensation circuit 208, i.e., $\beta(\omega)$ is approximately equal to 1 and hence, the capacitance of the first capacitor 210 is multiplied by the gain of a feedback loop comprising the error amplifier 202, the first voltage buffer 204, the transistor 206, and the frequency compensation circuit 208. Thus, it will be understood by those skill in the art that the voltage regulator 200 works similar to the conventional voltage regulator for ripple frequencies less than the first frequency. Hence, an absolute value of a power supply rejection ratio (PSRR) of the voltage regulator 200 is greater than a threshold value for ripple frequencies less than the first frequency. In one embodiment, the threshold value is 20 decibels (dB).

For ripple frequencies between the first frequency and a second frequency, the gain of the frequency compensation circuit 208 reduces as the impedance of the second capacitor 216 is less as compared to the impedance of the second capacitor 216 at ripple frequencies less than the first frequency. In one embodiment, the second frequency is 1000 MHz. This reduces the gain by which the capacitance of the first capacitor 210 is multiplied. Thus, a Miller effect capacitance of the first capacitor 210 is reduced, thereby improving the bandwidth of the error amplifier 202 in a frequency range that includes frequencies between the first and second frequencies. This prevents the PSRR in the frequency range from being degraded and improves the PSRR such that the absolute value of PSRR is greater than the threshold value, i.e., 20 dB in the frequency range.

For ripple frequencies greater than the second frequency, the PSRR of the voltage regulator 200 improves as the load capacitor 224 provides a low impedance to ground. Thus, the absolute value of the PSRR of the voltage regulator 200 for ripples frequencies greater than the second frequency is greater than the threshold value.

Thus, the absolute value of the PSRR of the voltage regulator 200 is greater than the threshold value at all ripple frequencies under any load condition. The voltage regulator 200 efficiently reduces the effect of ripples in the supply voltage signal on the output signal, thereby providing a regulated output signal. Further, the voltage regulator 200 works efficiently even if the transistor 206 has a small size, thereby reducing an area and power consumption of the voltage regulator 200.

In one embodiment, each of the first, second, and third voltage buffers 204, 214, and 218 is a dual-stage source follower circuit comprising a p-type source follower and an n-type source follower connected in series. However, it will be understood by those of skill in the art that the first, second, and third voltage buffers 204, 214, and 218 can be implemented in several other ways and will lie under the scope of the invention. The frequency compensation circuit 208, instead of being connected to the drain terminal of the transistor 206, may be connected to a voltage tap of the resistive network 212. Further, a nulling resistor may be connected in series with the first capacitor 210.

It will be further understood by those of skill in the art that the threshold value of the PSRR of the voltage regulator 200 is not restricted to 20 dB and the voltage regulator 200 can be designed such that the absolute value of the PSRR of the voltage regulator 200 is greater than a desired value for all ripple frequencies. Further, the first and second frequencies are not restricted to 100 MHz and 1000 MHz, respectively, and are used only for illustration purpose.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A voltage regulator, comprising:

an error amplifier having a first input terminal for receiving a reference signal, a second input terminal for receiving a feedback signal, and an output terminal for generating an intermediate control signal;

a first voltage buffer connected to the output terminal of the error amplifier for receiving the intermediate control signal and generating a control signal;

a transistor having a gate terminal connected to the first voltage buffer for receiving the control signal, a first terminal for receiving a supply voltage signal, and a second terminal for generating a regulated output signal;

a frequency compensation circuit connected to the second terminal of the transistor;

a first capacitor having a first terminal connected to the output terminal of the error amplifier and a second terminal connected to the frequency compensation circuit; and a resistive network connected to the second terminal of the transistor for receiving the regulated output signal and outputting the feedback signal, wherein the frequency compensation circuit comprises:

a second voltage buffer connected to the second terminal of the transistor;

a second capacitor having a first terminal connected to the second voltage buffer and a second terminal for receiving a logic high signal; and a third voltage buffer connected to the first terminal of the second capacitor and the output terminal of the error amplifier.

2. The voltage regulator of claim 1, wherein the first voltage buffer comprises a dual-stage source follower circuit.

3. The voltage regulator of claim 1, wherein each of the second and third voltage buffers is a dual-stage source follower circuit.

4. The voltage regulator of claim 1, wherein the resistive network includes a plurality of resistors and a voltage tap for outputting the feedback signal.

5. The voltage regulator of claim 1, wherein the first capacitor increases stability of the voltage regulator by splitting poles of the voltage regulator.

6. The voltage regulator of claim 1, wherein the first voltage buffer isolates the error amplifier from the transistor, thereby improving a bandwidth of the error amplifier and hence, a power supply rejection ratio (PSRR) of the voltage regulator.

7. The voltage regulator of claim 1, wherein the frequency compensation circuit reduces a Miller effect capacitance of the first capacitor, thereby reducing an effect of noise in the supply voltage signal on the regulated output signal and hence, improving a bandwidth of the error amplifier and a power supply rejection ratio (PSRR) of the voltage regulator.

8. The voltage regulator of claim 1, wherein the transistor is a p-channel metal oxide semiconductor (PMOS) transistor.

9. A voltage regulator, comprising:

an error amplifier having a first input terminal for receiving a reference signal, a second input terminal for receiving a feedback signal, and an output terminal for generating an intermediate control signal;

a first voltage buffer connected to the output terminal of the error amplifier for receiving the intermediate control signal and generating a control signal;

a transistor having a gate terminal connected to the first voltage buffer for receiving the control signal, a first terminal for receiving a supply voltage signal, and a second terminal for generating a regulated output signal, wherein the first voltage buffer isolates the error amplifier from the transistor;

a frequency compensation circuit connected to the second terminal of the transistor;

a first capacitor having a first terminal connected to the output terminal of the error amplifier and a second terminal connected to the frequency compensation circuit, wherein the frequency compensation circuit reduces a Miller effect capacitance of the first capacitor; and a resistive network connected to the second terminal of the transistor for receiving the regulated output signal and outputting the feedback signal, wherein the frequency compensation circuit comprises:

a second voltage buffer connected to the second terminal of the transistor;

a second capacitor having a first terminal connected to the second voltage buffer and a second terminal for receiving a logic high signal; and a third voltage buffer connected to the first terminal of the second capacitor and the output terminal of the error amplifier.

10. The voltage regulator of claim 9, wherein the first voltage buffer is a dual-stage source follower circuit.

11. The voltage regulator of claim 9, wherein each of the second and third voltage buffers is a dual-stage source follower circuit.

12. The voltage regulator of claim 9, wherein the resistive network includes a plurality of resistors and a voltage tap for outputting the feedback signal.

13. The voltage regulator of claim 9, wherein the first capacitor splits poles of the voltage regulator.

14. The voltage regulator of claim 9, wherein the transistor is a p-channel metal oxide semiconductor (PMOS) transistor.

* * * * *